United States Patent [19]

Moens et al.

[11] Patent Number: 5,306,786
[45] Date of Patent: Apr. 26, 1994

[54] CARBOXYL GROUP-TERMINATED POLYESTERAMIDES

[75] Inventors: Luc Moens, Sint Genesius-Rode; Daniel Maetens; Jean-Marie Loutz, both of Brussels, all of Belgium

[73] Assignee: U C B S.A., Drogenbos, Belgium

[21] Appl. No.: 807,607

[22] Filed: Dec. 16, 1991

[30] Foreign Application Priority Data

Dec. 21, 1990 [GB] United Kingdom ............... 9027793

[51] Int. Cl.$^5$ ............................................. C08F 20/00
[52] U.S. Cl. .................................... 525/437; 528/272; 528/288; 528/302; 528/303; 528/304; 528/307; 528/308; 528/308.6; 528/332; 528/335; 525/448; 525/450; 525/539; 427/370.2
[58] Field of Search ............. 528/272, 288, 302, 303, 528/304, 307, 308, 308.6, 332, 335; 525/437, 448, 450, 539; 427/372.2

[56] References Cited

U.S. PATENT DOCUMENTS 4,501,879 2/1985 Barbee et al. ................. 528/288

FOREIGN PATENT DOCUMENTS 59-0155477 9/1984 Japan .

*Primary Examiner*—Samuel A. Acquah
*Attorney, Agent, or Firm*—Wenderoth, Lind & Ponack

[57] ABSTRACT

Carboxyl group-terminated polyesteramides comprising the reaction products of at least one diamine and a carboxyl group-terminated polyester selected from
(a) a polyester prepared from at least one aliphatic and/or cycloaliphatic dicarboxylic acid and at least one polyol;
(b) a polyester which is the reaction product of
 (i) at least one aliphatic and/or cycloaliphatic dicarboxylic acid and/or isophthalic acid, with
 (ii) a hydroxyl group-terminated polyester, and
(c) a polyester which is the reaction product of
 (i) at least one aliphatic and/or cycloaliphatic dicarboxylic acid, with
 (ii) a polyester containing both terminal hydroxyl and terminal carboxyl groups, prepared by esterification of
 (iii) isophthalic acid with
 (iv) a hydroxyl group-terminated polyester, processes for preparing the same, and the powdered thermosetting compositions based on these polyesteramides and polyepoxy compounds for the production of powdered varnishes and paints which can be applied with a triboelectric spray gun.

23 Claims, No Drawings

CARBOXYL GROUP-TERMINATED POLYESTERAMIDES

The present invention relates to carboxyl group-terminated polyesteramides, to powdered thermosetting compositions based on these polyesteramides and epoxy compounds, as well as to processes for the preparation thereof.

The invention also relates to the use of these compounds and of these compositions for the production of powdered varnishes and paints which are suitable for application with a triboelectric spray gun.

The powdered thermosetting compositions are, inter alia, widely used as paints and varnishes for coating domestic electric appliances, bicycles, garden furniture, accessories for the automobile industry, and the like.

These powdered thermosetting compositions have several advantages over liquid thermosetting compositions for the following reasons a) they do not contain solvents. Consequently, problems of intoxication, pollution and fire associated with the use of solvents are avoided;

b) they are more economical, first because solvents are not used and secondly because the excess thermosetting powder, which is not fixed onto the substrate to be coated at the time of application may, in principle, be recovered completely and recycled, and c) they permit the formation of thick coatings in a single layer, which cannot be achieved with similar compositions containing solvents.

Powdered varnishes and paints are usually applied onto the article to be coated, which is a conductor of electricity, by means of an electrostatic spray gun. In this application technique, a high voltage current generator is used, producing a potential difference of at least 30 to 40,000 volts between the electrode in the gun and the article to be coated, which is grounded. For this reason, the powder particles projected into the electric field created between the gun and the article are charged with electrostatic electricity during the collisions with ionized air, and are deposited in the form of a regular coating which adheres to the surface of the article. The excess projected powder, which does not adhere to the article because of the insulating effect of the particles already retained, can be recovered and recycled. The coated article is then heated in an oven, where the cross-linking of the thermosetting binder of the coating is carried out. In this manner it acquires its final mechanical and chemical properties.

Although, at present, this electrostatic process is the most frequently used process for applying powdered varnishes and paints, it nevertheless has a certain number of drawbacks. Indeed, the use of high voltage current generates fire and explosion hazards (production of sparks), and exposes the person using the spray gun safety problems. In addition, because of the existence of the electric field, field lines establish between the gun and the article and cause the well-known Faraday cage effect, which prevents the charged powder from covering the entire surface of articles of complex shape. It is consequently very difficult to coat uniformly the entire surface of the article, particularly when the articles have a complicated and hollow form, such as grilles, display units, chains, garden equipment, fencings and the like.

Moreover, it is often difficult to achieve uniform layers of paint, because the discharge of the ionized powder particles destroys the layer of previously deposited particles and causes pinholes and increased porosity in the coatings produced.

To overcome these various drawbacks, a new electrostatic application technique, using triboelectricity, has recently been developed and meets with ever-increasing success. In this technique, powders are applied onto the article to be coated by means of a triboelectric spray gun, in which the powder particles acquire an electrostatic charge by friction inside the gun, caused by their passage through a tube (or tubes) of a suitable material, usually based on polytetrafluoroethylene. In contradistinction to the conventional spray gun with electrodes, here, the powder particles become electrostatically charged by friction between the particles and the walls of plastic tubes in the gun. This friction leads the powder to release electrons and each powder particle, thus takes a positive charge. In a triboelectric charging device of this type, the powder is sprayed by means of a fluidized bed connected to the gun. The powder particles, charged with electricity by friction, are then directed by means of a stream of compressed air towards the areas of the article to be coated. Since the article is grounded, the powder particles are attracted to it and deposited in the form of a regular coating adhering to the surface of the article. On the other hand, the excess powder, which does not adhere to the article because of the insulating effect of the particles already retained on its surface, can be recovered and recycled exactly as in the conventional electrostatic process described above.

Compared with the application technique employing a conventional electrostatic spray gun, the process using the triboelectric spray gun enjoys a number of important advantages. These include the absence of electrode(s) and of a high voltage current generator, which renders the triboelectric gun safer to use;

the absence of electric field lines and, consequently, of Faraday cage effects;

the ability to coat complicated or hollow objects more uniformly with complete penetration into corners, behind edges and into deep cavities, thanks to the absence of Faraday cage effects;

the realization of much more uniform layers of paint, even of a great thickness extending up to 350–450 micrometers;

the ability to obtain less, paint layers and free of pinholes;

where appropriate, the elimination of one or more retouching stations.

However, a major drawback of the triboelectric process is that not all powdered thermosetting compositions are suitable for forming coatings by projection with a triboelectric spray gun. Indeed, there are many powdered compositions which acquire no charge or only a very weak electrostatic charge in a triboelectric gun, in which the friction surfaces are made of a material based on polytetrafluoroethylene. Only a few compositions, such as, for example, those containing epoxy resins combined with dicyandiamide as binders, are actually suitable. Thus, powdered thermosetting compositions based on carboxyl group-terminated polyesters and epoxy compounds, which have successfully been used for several years in the conventional electrostatic process, are unsuitable for obtaining coatings using the triboelectric process. In fact, compositions based on these polyesters remain substantially uncharged by friction on a polytetrafluoroethylene surface.

One proposed solution to resolve this problem, is the addition to these powdered thermosetting compositions of particular additives intended to render the resulting compositions capable of acquiring a higher electrostatic charge allowing their application by a triboelectric spray gun. For example, the addition of tertiary amines and quaternary ammonium salts, such as for example, triethylamine and lauryltrialkylammonium sulfate, has been proposed in German Patent Application Nos. 3,600,395 and 3,725,738. European Patent Application No. 260,638 describes powder compositions, for electrostatic coating to which an agent for increasing the electric charge, such as a metal complex azo compound, a phthalocyanine compound and the like, has been added; whereas European Patent Application No. 300,818 proposes the addition of aluminium oxide and/or aluminium hydroxide to the compositions.

But, if the addition of these additives to powdered thermosetting compositions enables the electrostatic charge acquired by the powder particles in triboelectric guns to be effectively increased, the presence of these additives in the powders also leads to a number of other significant technical difficulties, for which no solution has yet been reached. In the first instance, clogging of the air filters of the triboelectric charging device frequently occurs, leading to intermittent stopping of the apparatus for cleaning purposes. Moreover, certain additives have an undesirable catalytic activity on the cross-linking reaction, resulting in yellowing and/or an orange-peel appearance of the films of varnish and paint obtained after curing.

Thus it is still of interest to develop new binders containing carboxyl groups, which can be cured by means of epoxy compounds, which can be formulated into powdered compositions capable of being electrostatically charged in a triboelectric spray gun, and which enable coatings to be formed by the triboelectric process without having recourse to the use of additives such as those described above, while producing at the same time paint and varnish coatings having properties at least equivalent to those of corresponding coatings obtained from compositions of the prior art which are based on carboxyl group-terminated polyesters and epoxy compounds applied with conventional electrostatic spray guns.

Therefore, it is an object of the present invention to provide new binders containing terminal carboxyl groups, curable by means of epoxy compounds, which can be used effectively in powdered coating compositions capable of being applied by a triboelectric spray gun and, more particularly, to provide powdered thermosetting coating compositions suitable for application with a triboelectric spray gun without the necessity of adding a particular additive.

These objects and other objects of the present invention which will become apparent on reading this specification, are achieved by the present invention, which relates to carboxyl group-terminated polyesteramides comprising the reaction products of at least one diamine and a carboxyl group-terminated polyester, said carboxyl group-terminated polyester being selected from the group consisting of (a) a polyester prepared from at least one aliphatic and/or cycloaliphatic dicarboxylic acid and at least one polyol;
(b) a polyester which is the reaction product of
  (i) at least one dicarboxylic acid selected from aliphatic dicarboxylic acids, cycloaliphatic dicarboxylic acids and isophthalic acid, with
  (ii) a hydroxyl group-terminated polyester prepared from at least one aromatic and/or aliphatic and/or cycloaliphatic polycarboxylic acid and at least one polyol;
(c) a polyester which is the reaction product of
  (i) at least one aliphatic and/or cycloaliphatic dicarboxylic acid, with
  (ii) a polyester containing both terminal hydroxyl and terminal carboxyl groups, prepared by esterification of
  (iii) isophthalic acid with
  (iv) a hydroxyl group-terminated polyester prepared from at least one aromatic and/or aliphatic and/or cycloaliphatic polycarboxylic acid and at least one polyol.

The carboxyl group-terminated polyesteramides according to the invention preferably have an acid number of from 10 to 100 mg KOH/g, more preferably of from 20 to 70 mg KOH/g, and a number-average molecular weight of between 1,000 and 16,000, more preferably between 1,500 and 8,500.

The essential characteristic of the carboxyl group-terminated polyesteramides according to the invention is the mandatory presence of ester bonds and amide bonds in each molecule. As a matter of fact, the amide bonds provide the favorable behavior of these compounds, as regards the triboelectric charging characteristics of the powders formulated with them. That is also the reason why the carboxyl group-terminated polyesteramides according to the invention have to be prepared in two steps by first preparing a polyester containing terminal carboxyl groups and then reacting the polyester thus obtained with a diamine. Indeed, if it is attempted to prepare these polyesteramides in a single step, by reacting together all the constituents needed for their preparation (i.e. diamines, polycarboxylic acids and polyols), the product obtained is not the desired polyesteramide but a heterogeneous mixture containing a polyamide, a polyester and unreacted starting materials. This mixture is unsuitable for formulating powders suitable for application by a triboelectric process.

Thus, the carboxyl group-terminated polyesteramides according to the invention have a polymer chain which contains both ester groups and amide groups, which confer to these compounds the required properties so that, when they are used as binders together with epoxy compounds, they provide powdered varnishes and paints which can be used to obtain coatings by means of a triboelectric spray gun. This is thus a first and very significant advantage over the carboxyl group-terminated polyesters of the prior art, which always require the addition of particular additives with all the aforementioned drawbacks.

Several processes are available for preparing the carboxyl group-terminated polyesteramides of the present invention I. Two-step process.
(1) A straight- or branched-chain carboxyl group-terminated polyester is first prepared from at least one aliphatic and/or cycloaliphatic dicarboxylic acid and at least one polyol in the molar proportions required to obtain carboxyl group-terminated chain ends, and (2) the preparation of the polyesteramides according to the invention is completed by reacting the carboxyl group-terminated polyester prepared in I(1) with at least one diamine.

Among the aliphatic or cycloaliphatic dicarboxylic acid used for the preparation of the carboxyl group-terminated polyester in I(1), there may be mentioned adipic acid, succinic acid, glutaric acid, sebacic acid, azelaic acid, 1,2-, 1,3- and 1,4-cyclohexanedicarboxylic acid, tetrahydrophthalic acid, hexahydrophthalic acid and the anhydrides thereof, as well as other analogous compounds, either alone or in admixture.

The polyol is preferably a dihydric to tetrahydric aliphatic, cycloaliphatic or aromatic polyol. It is advantageously selected from the diols such as neopentylglycol, ethylene glycol, diethylene glycol, 1,2-propanediol, 1,3-propanediol, 1,4-butanediol, 1,5-pentanediol, 1,6-hexanediol, neopentylglycol hydroxypivalate, bisphenol A, 1,4-cyclohexanedimethanol, 2,2-bis(4-hydroxycyclohexyl)-propane, and other analogous compounds, either alone or in admixture. The particularly preferred polyol is neopentylglycol. The use of these diols enables straight-chain polyesters to be prepared. In addition to the above diols, polyols containing three or four hydroxyl groups, such as trimethylolpropane, di-trimethylolpropane, pentaerythritol and other analogous compounds, are advantageously used for the preparation of branched-chain polyesters.

The amount by weight of aliphatic and/or cycloaliphatic dicarboxylic acid with respect to the amount by weight of polyol used for the synthesis of the carboxyl group-terminated polyester in I(l) is such that the acid number of the polyester obtained is preferably in the range of from 20 to 200 mg KOH/g, and advantageously of from 30 to 110 mg KOH/g.

The diamine used for the preparation of the carboxyl group-terminated polyesteramides in I(2) can be a diprimary or disecondary diamine or a diamine which is both primary and secondary, preferably a diprimary diamine. This diamine can be aliphatic, cycloaliphatic or aromatic, preferably aliphatic or cycloaliphatic.

Examples of diamines which can be used, either alone or in combination, are ethylenediamine, 1,3-propanediamine, 1,5-pentanediamine, 1,6-hexanediamine, 1,2-, 1,3- and 1,4-cyclohexanediamine, 2,2-dimethyl-1,3-propanediamine, N-(2-aminoethyl)-1,2-ethanediamine, 3,3'-dimethyl-4,4'-diaminodicyclohexylmethane, 4,4'-diaminodicyclohexylmethane, 3,3'-dimethyl-4,4'-diaminodiphenylmethane, 4,4'-diaminodiphenylmethane and analogous compounds.

The amount by weight of diamine with respect to the amount by weight of carboxyl group-terminated polyester used in I(2) is such that the acid number of the carboxyl group-terminated polyesteramide is of from 10 to 100 mg KOH/g, and preferably of from 20 to 70 mg KOH/g.

So that the final polyesteramide does not contain free amino groups, it is recommended that the number of equivalents of amino groups, provided by the diamine, should be deficient with respect to the number of equivalents of carboxyl groups in the carboxyl group-terminated polyester.

II. Three-step process.

(1) A straight- or branched-chain hydroxyl group-terminated polyester is first prepared from at least one aromatic and/or aliphatic and/or cycloaliphatic polycarboxylic acid and at least one polyol in the proportions required to obtain hydroxyl group-terminated chain ends;

(2) the hydroxyl group-terminated polyester prepared in II(1) is esterified in a further step with at least one dicarboxylic acid selected from aliphatic dicarboxylic acids, cycloaliphatic dicarboxylic acids and isophthalic acid, to obtain a carboxyl group-terminated polyester, and (3) the preparation of the polyesteramides according to the invention is completed by reacting the carboxyl group-terminated polyester prepared in II(2) with a least one diamine.

The polycarboxylic acid used in II(1) for preparing the hydroxyl group-terminated polyester is preferably an aromatic acid, examples of this being o-phthalic acid, isophthalic acid and terephthalic acid. However, these aromatic acids can also be replaced, in part or completely, by aliphatic or cycloaliphatic polycarboxylic acids, such as adipic acid, succinic acid, azelaic acid, 1,4-cyclohexanedicarboxylic acid, tetrahydrophthalic acid, hexahydrophthalic acid and the anhydrides thereof, as well as other analogous compounds, either alone or in admixture. The particularly preferred polycarboxylic acid is terephthalic acid.

The polyol used in II(1) can be any polyol chosen from those mentioned above for the preparation of the carboxyl group-terminated polyester in I(1) in the two-step process, and is preferably neopentylglycol. For the preparation of branched-chain polyesters use can be made of either tri- or tetrahydric polyols such as those mentioned above, or tri- or tetracarboxylic acids, such as 1,2,4-benzenetricarboxylic acid (or anhydride), 1,3,5-benzenetricarboxylic acid and other analogous compounds. The branching is preferably introduced at this step of the synthesis.

The amount by weight of polyol with respect to the amount by weight of polycarboxylic acid used for the synthesis of the hydroxyl group-terminated polyester in II(1) is such that the hydroxyl number of the polyester obtained is preferably of from 30 to 400 mg KOH/g, and advantageously of from 50 to 150 mg KOH/g.

The aliphatic or cycloaliphatic dicarboxylic acid used in II(2) can be any dicarboxylic acid chosen from those mentioned above for the preparation of the carboxyl group-terminated polyester in I(1) in the two-step process.

The amount by weight of dicarboxylic acid with respect to the amount by weight of hydroxyl group-terminated polyester used for the synthesis of the carboxyl group-terminated polyester in II(2) is such that the acid number of the polyester obtained is preferably of from 20 to 200 mg KOH/g and advantageously of from 30 to 110 mg KOH/g.

It is also possible to use isophthalic acid in II(2), but only provided that the acid number of the carboxyl group-terminated polyester obtained is equal to or less than 50 mg KOH/g.

The diamine used in II(3) can be any diamine chosen from those mentioned above for the preparation of the carboxyl group-terminated polyesteramides in I(2) in the two-step process.

The amount by weight of diamine with respect to the amount by weight of carboxyl group-terminated polyester used in II(3) is such that the acid number of the carboxyl group-terminated polyesteramide is of from 10 to 100 mg KOH/g and preferably of from 20 to 70 mg KOH/g.

III. Four-step process.
(1) A straight- or branched-chain hydroxyl group-terminated polyester is first prepared from at least one aromatic, and/or aliphatic and/or cycloaliphatic polycarboxylic acid and at least one polyol in the proportions required to obtain hydroxyl group-terminated chain ends;
(2) the hydroxyl group-terminated polyester prepared in III(1) is esterified with isophthalic acid in the proportions required to obtain a polyester containing both terminal hydroxyl and terminal carboxyl groups;
(3) the polyester containing both terminal hydroxyl and terminal carboxyl groups prepared in III(2) is esterified in a further step with at least one aliphatic and/or cycloaliphatic dicarboxylic acid, to obtain a carboxyl group-terminated polyester, and
(4) the preparation of the polyesteramide according to the invention is completed by reacting the carboxyl group-terminated polyester prepared in III(3) with at least one diamine.

The polycarboxylic acid used in III(1) can be any polycarboxylic acid chosen from those mentioned above for the preparation of the hydroxyl group-terminated polyester in II(1) in the three-step process. The particularly preferred polycarboxylic acid is terephthalic acid.

The polyol used in III(1) can be any polyol chosen from those mentioned above for the preparation of the carboxyl group-terminated polyester in I(1) in the two-step process and is preferably neopentylglycol. The amount by weight of polyol with respect to the amount by weight of polycarboxylic acid used for the synthesis of the hydroxyl group-terminated polyester in III(1) is such that the hydroxyl number of the polyester obtained is preferably of from 30 to 400 mg KOH/g and advantageously of from 50 to 150 mg KOH/g.

The amount by weight of isophthalic acid with respect to the amount by weight of hydroxyl group-terminated polyester used for the synthesis of the polyester containing both terminal hydroxyl and terminal carboxyl groups in III(2), is such that the difference between the hydroxyl number and the acid number of the polyester obtained is preferably between $-100$ and $+100$ mg KOH/g and advantageously between $-50$ and $+50$ mg KOH/g.

The aliphatic or cycloaliphatic dicarboxylic acid used in III(3) can be any dicarboxylic acid chosen from those mentioned above for the preparation of the carboxyl group-terminated polyester in I(1) in the two-step process.

The molar ratio between the aliphatic and/or cycloaliphatic dicarboxylic acid used in III(3) and the isophthalic acid used in III(2) may vary from 1:99 to 99:1.

The amount by weight of dicarboxylic acid with respect to the amount by weight of polyester containing both terminal hydroxyl and terminal carboxyl groups used for the synthesis of the carboxyl group-terminated polyester in III(3) is such that the acid number of the polyester obtained is preferably of from 20 to 200 mg KOH/g, advantageously of from 30 to 110 mg KOH/g.

The diamine used in III(4) can be any diamine chosen from those mentioned above for the preparation of the carboxyl group-terminated polyesteramide.

The amount by weight of diamine with respect to the amount by weight of carboxyl group-terminated polyester used in III(4) is such that the acid number of the carboxyl group-terminated polyesteramide is of from 10 to 100 mg KOH/g, preferably of from 20 to 70 mg KOH/g.

For the four-step synthesis to proceed smoothly, it is to be recommended that the number of equivalents of amino groups in the diamine should not exceed the number of equivalents of carboxyl groups in the aliphatic or cycloaliphatic dicarboxylic acid used in III(3).

The three- and four-step processes are the preferred processes.

A conventional reactor equipped with a stirrer, an inlet and outlet for an inert gas (nitrogen), a thermocouple, an adiabatic column, a condenser, a water separator and a tube for vacuum connection is generally used for the preparation of the carboxyl group-terminated polyesteramides.

The esterification conditions used for preparing the intermediate polyesters are conventional, that means that a customary esterification catalyst can be used, such as dibutyltin oxide, n-butyltin thioctanoate or dibutyltin dilaurate, in an amount of 0.01 to 0.5% by weight of the reactants and, if appropriate, an antioxidant can be added, for example triphenyl phosphite, in an amount of 0.01 to 0.5% weight of the reactants.

The polyesterification is generally carried out at a temperature which is increased progressively from 130° C. to about 20° to 240° C., initially under normal pressure and then under reduced pressure, these operating conditions being maintained until a polyester having the desired hydroxyl and/or acid number is obtained. The degree of esterification is monitored by determination of the amount of water formed during the reaction and the properties of the polyester obtained, for example the hydroxyl number, the acid number, the molecular weight or the viscosity.

The reaction between the carboxyl group-terminated polyester and the diamine is advantageously carried out by adding the appropriate amount of the diamine to the molten polyester in the reactor described above and heating the mixture to a temperature of from 18° to 240° C., initially under normal pressure and then under reduced pressure, until a carboxyl group-terminated polyesteramide having the desired acid number, which may be between 10 and 100 mg KOH/g, and the desired molecular weight, which may preferably be between 1,500 and 8,500, is obtained.

The amount of diamine used may vary between 1 and 20 parts by weight, preferably between 1 and 10 parts by weight per 100 parts of carboxyl group-terminated polyesteramide.

Depending on the nature of the polyesteramide thus obtained, a small amount of a cross-linking catalyst of the amine, phosphine, ammonium or phosphonium salt type, together with known stabilizers can be added, if appropriate, at the end of the synthesis. Detailed examples of the preparation of the polyesteramides according to the invention will be given hereinafter.

At the end of the synthesis, the carboxyl group-terminated polyesteramide is cast into a thick layer, allowed to cool, whereafter it is ground into particles having an average size of from a fraction of a millimeter to a few millimeters.

The carboxyl group-terminated polyesteramides according to the invention are solid compounds at room temperature which have a glass transition temperature of between 50° and 70° C. In the liquid state, these compounds have relatively high viscosities ranging from 100 to 10,000 mpa.s, measured at 200° C. by the cone and plate viscometer (ICI viscosity as described by P. S. Pond and C. H. MONK in J. Oil. Col. Chem. Assoc., 53, (1970), 876-883; ASTM D4287-88).

The polyesteramides according to the invention are intended for use mainly as binders, together with epoxy compounds, in the preparation of powdered thermosetting compositions which can be used in particular as varnishes and paints suitable for application with a triboelectric spray gun.

The present invention thus also relates to powdered thermosetting compositions comprising (a) a carboxyl group-terminated polyesteramide according to the invention and (b) a polyepoxy compound.

The present invention also relates to the use of the thermosetting compositions according to the invention for the preparation of powdered varnishes and paints as well as to the powdered varnishes and paints obtained by means of these compositions.

Finally, the invention also relates to a process for coating an article, preferably a metallic article, which comprises applying to said article a powdered thermosetting composition according to the invention by spraying preferably by means of a triboelectric spray gun, and curing the coating thus obtained.

The polyepoxy compounds which can be used for the preparation of the powdered thermosetting compositions according to the invention are the polyepoxy compounds usually employed in this type of compositions. Such compounds are described, for example, in U.S. Pat. No. 4,085,159.

The preferred polyepoxy compounds are products which are solid at room temperature which contain on average at least two epoxy groups per molecule, such as, for example, solid epoxy resins based on bisphenol A and epichlorohydrin, i.e. bisphenol A diglycidyl ether and its addition products of higher molecular weight. Examples of these epoxy resins are the Epikote resins marketed by SHELL, the Araldite resins marketed by CIBA-GEIGY, such as that sold under the commercial name of Araldite GT 7004, the DER resins marketed by DOW CHEMICAL and the like. A particularly preferred polyepoxy compound is triglycidyl isocyanurate, such as that sold by CIBA-GEIGY under the commercial name of Araldite PT 810.

The polyepoxy compound can be used in an amount of from 0.7 to 1.3, preferably of from 0.95 to 1.05 equivalents of epoxy groups per equivalent of carboxyl groups in the carboxyl group-terminated polyesteramide.

For the preparation of the powdered thermosetting compositions the carboxyl group-terminated polyesteramide, the polyepoxy compound and the various auxiliary substances conventionally used in the manufacture of powdered paints and varnishes are homogeneously mixed. This homogenization is carried out, for example, by melting the polyesteramide, the polyepoxy compound and the various auxiliary substances at a temperature in the range of from 90° to 100° C., preferably in an extruder, for example a Buss-Ko-Kneter extruder or a twin-screw Werner-Pfleiderer or Baker Perkins extruder. Thereafter, the extrudate is allowed to cool and is ground and sieved to give a powder of which the particle size is between 25 and 100 micrometers.

The auxiliary substances which can be added to the powdered thermosetting compositions include, for example, pigments, such as titanium dioxide or iron oxides, organic dyestuffs and the like, fillers, such as barium sulfate or calcium sulfate or carbonate, flow regulators such as Resiflow PV5 (from WORLEE), Modaflow (from MANSANTO) or Acronal 4F (from BASF), plasticizers such as dicyclohexyl phthalate or triphenyl phosphate, grinding auxiliary agents and cross-linking catalysts of the amine, phosphine, ammonium or phosphonium salt type, which are known per se. These auxiliary substances are used in the usual amounts, it being understood that if the thermosetting compositions according to the invention are used as varnishes, auxiliary substances having opacifying properties will be omitted.

The powdered paints and varnishes according to the present invention are intended in particular to be applied onto the article to be coated by spraying by means of a triboelectric charging device, such as, for example, the TRIBOMATIC-NORDSON system from NORDSON or the IDEAL system from IDEAL. However, taking into account the nature of these powdered thermosetting compositions, it is obvious that they are also suitable, a fortiori, for application by traditional techniques, i.e. for application with a spray gun in an electrostatic field or by the well-known a fluidized bed coating technique.

After having been applied to the article in question, the coatings deposited are cured by heating in an oven at a temperature of from 140° to 220° C., preferably of from 160° to 200° C., for a period up to 30 minutes, in order to obtain complete cross-linking of the coating.

As shown in more detail in the examples which follow, it is possible to prepare the polyesteramides according to the invention by three different synthesis routes. This thus allows the chemical, physical and technological properties of these compounds to be modified as required, in order to adjust them to their future applications, merely by varying the method of synthesis. In fact, the choice of a particular method of synthesis will depend on the characteristics required in the final product, such as the acid number, the functionality, the viscosity, the glass transition temperature, and the desired qualities of the coatings. In other words, an advantageous characteristic of the polyesteramides according to the invention is that they can be "tailormade" according to the commercial application for which they are intended Furthermore, as will be seen more particularly in Example 27, the powdered thermosetting compositions according to the invention have excellent triboelectric properties. Moreover, the cured coatings obtained with these compositions have a whole of favorable properties both as regards their appearance (gloss and spreading) and their mechanical properties and as regards their weather-resistance (c.f. Example 28). These properties, furthermore, are comparable in all respects to those obtained with compositions based on polyesters of the prior art, but applied with a spray gun in an electric field.

The examples which follow illustrate the invention without limiting it. In these example, all parts are by weight, unless otherwise indicated.

In Tables I, II and III, the various compounds used for the preparation of the polyesteramides and the polyesters introduced by way of comparison are given the following abbreviations

| | |
|---|---|
| TPA | terephthalic acid |
| IPA | isophthalic acid |
| AdA | adipic acid |
| CHDA | 1,4-cyclohexanedicarboxylic acid |
| 1,3,5BTA | 1,3,5-benzenetricarboxylic acid |

-continued

| | |
|---|---|
| 1,2,4BTA | 1,2,4-benzenetricarboxylic acid |
| HHPAn | hexahydrophthalic anhydride |
| TMAn | trimellitic anhydride |
| NPG | neopentylglycol |
| TMP | trimethylolpropane |
| dTMP | di-trimethylolpropane |
| PE | pentaerythritol |
| EG | ethylene glycol |
| NHP | neopentylglycol hydroxypivalate |
| DADCHM | 4,4'-diaminodicyclohexylmethane |
| DMPDA | 2,2-dimethyl-1,3-propanediamine |
| DMDACHM | 3,3'-dimethyl-4,4'-diaminodicyclohexylmethane |
| DACH | 1,4-cyclohexanediamine |
| HMDA | 1,6-hexanediamine |
| BPA | hydrogenated bisphenol A. |

EXAMPLES 1 TO 4

Two-step Polyesteramide Synthesis (1) 1st step.

282 parts of neopentylglycol and 58.5 parts of trimethylolpropane are introduced into a conventional reactor equipped with a stirrer, an inert gas (nitrogen) inlet, a thermocouple, an adiabatic column, a condenser, a water separator and a tube for vacuum connection. The mixture is heated at 130° C. until the substances have melted, and 724 parts of 1,4-cyclohexanedicarboxylic acid and 2.7 parts of dibutyltin oxide, as the esterification catalyst, are then introduced. The temperature of the reaction mixture is then raised progressively to 220° C. When 95% of the water of esterification has distilled off and the polyester is completely clear, the pressure is reduced progressively in one hour from normal pressure to 50 mm Hg. The operation is continued in vacuo until the required acid number is obtained. The carboxyl group-terminated polyester thus obtained has an acid number of 100 mg KOH/g.

2nd step.

The reaction mixture obtained in the first step is cooled to 200° C. and 53.2 parts of 4,4'-diaminodicyclohexylmethane and 1 part of triphenyl phosphite are added. After the mixture has been heated at 200° C. for one hour and when the polyester is completely clear, 1 part of triphenyl phosphite is still added and the pressure is reduced progressively to 50 mm Hg in one hour. The reaction is continued in vacuo until the required acid number is obtained. The final polyesteramide then has an acid number of 70 mg KOH/g. The viscosity, determined by the cone and plate viscometer (ICI viscosity) at 200° C., is about 3,000 mpa.s, the average molecular weight $\overline{Mn}$ is 2,300 and the glass transition temperature (Tg) is 54 (determined by differential scanning calorimetry or DSC). The coloration of the product according to ASTM D2849 is at most 2 (expressed in Gardner units). In addition, 5 parts of triphenylphosphine, as cross-linking catalyst, are added to the product obtained.

(2), (3) and (4).

The method is identical to that described in Example 1. Table I below shows the nature and amounts of the starting materials used, the amounts of the esterification catalyst (dibutyltin oxide), as well as the acid number (AN) of the carboxyl group-terminated polyester obtained in the first step and the acid number (AN), the ICI viscosity at 200° C., the average molecular weight Mn and the glass transition temperature (Tg, determined by DSC) of the final polyesteramide obtained in the second step. The coloration according to ASTM D2849 of the polyesteramides obtained is not more than 2 (expressed in Gardner units).

A carboxyl group-terminated polyester, numbered C1, which is not according to the invention and which is introduced by way of comparison is also prepared.

The polyester C1 is prepared by a one-step process, according to the process described in the first step of Example 1.

TABLE I

| Ex. | Step | Polyol(s) (parts) | Acid (parts) | Catalyst (parts) | Diamine (parts) | AN of the polyester (mg KOH/g) | AN of the polyesteramide (mg KOH/g) | ICI Viscosity at 200° C. (mPa · s) | $\overline{Mn}$ | Tg (°C.) |
|---|---|---|---|---|---|---|---|---|---|---|
| 2 | 1 | NPG(331) TMP(42) | CHDA(734) | 2.7 | | 70 | | | | |
| | 2 | | | | DMPDA(18) | | 49 | 6,000 | 3,500 | 60 |
| 3 | 1 | NPG(352) dTMP(25.5) | CHDA(705) | 2.7 | | 60 | | | | |
| | 2 | | | | DADCHM(54) | | 29.5 | 3,800 | 3,500 | 56 |
| 4 | 1 | BPA(285.1) NPG(142.5) TMP(27.6) | CHDA(608.6) | 1.5 | | 78 | | | | |
| | 2 | | | 0.8 | DADCHM(47.5) | | 50 | 8,500 | 3,300 | 58 |
| C1 | 1 | BPA(335.4) NPG(145.1) TMP(24.3) | CHDA(603.5) | 1.9 | | 50 | | | 7,000 | 3,100 | 55 |

EXAMPLES 5 TO 18

Three-step Polyesteramide Synthesis (5) 1st step.

308 parts of neopentylglycol and 45 parts of trimethylolpropane are introduced into a conventional reactor as described above in Example 1. The mixture is heated at 130° C. until the substances have melted, and 423 parts of terephthalic acid and 0.8 part of dibutyltin oxide, as the esterification catalyst, are then introduced. The temperature of the reaction mixture is then raised progressively to 220° C. When 95% of the water of esterification has distilled off and the polyester is clear, a vacuum is gradually established in the course of one hour until it reaches 50 mm Hg. The reaction is continued in vacuo and a hydroxyl group-terminated polyester having a hydroxyl number of 150 mg KOH/g, is thus obtained.

2nd step.

The reaction mixture obtained in the above step is cooled to 200° C., and 291.5 parts of 1,4-cyclohexanedicarboxylic acid and 2.4 parts of dibutyltin oxide, as the catalyst, are added. The reaction is allowed to continue for about one hour, until the reaction mixture becomes clear. A vacuum is gradually established in the course of about 30 minutes down to 50 mm Hg, and this pressure is maintained until the required acid number of the carboxyl group-terminated polyester is reached. This polyester then has an acid number of 100 mg KOH/g.

3rd step.

53 parts of 4,4'-diaminodicyclohexylmethane are added to the reaction mixture, which is kept at 200° C. After the mixture has been heated at 200° C. for one hour and when the polyesteramide is clear, a vacuum is gradually established in the course of about 30 minutes down to 50 mm Hg. The reaction is continued in vacuo (50 mm Hg) for one hour. At that time, the carboxyl group-terminated polyesteramide obtained has an acid number of 70 mg KOH/g. The viscosity, determined by the cone and plate viscometer (ICI viscosity) at 200° C., is 2,700 mpa.s, the average molecular weight $\overline{M}n$ is 2,500 and the glass transition temperature (Tg) is 55 (DSC). The coloration of the product according to ASTM D2849 is not more than 2 (Gardner). In addition, 5 parts of triphenylphosphine, as cross-linking catalyst, are added to the product obtained.

(6 to 18).

The method is the same as that described in example 5, with the exception of Example 13. In Example 13, the second and third step are carried out in the following manner.

For the second step, the polyester obtained in the first step is condensed with 155.5 parts of isophthalic acid and 1.2 parts of dibutyltin oxide, as the catalyst, at 225° C. for 4 hours. A vacuum is then gradually established in the course of 3 hours down to 50 mm Hg., and this pressure is maintained for 1 hour until the required acid number of the polyester is reached. This polyester then has an acid number of 50 mg KOH/g.

For the third step, the reaction mixture is cooled to 200° C. and 43 parts of 4,4'-diaminodicyclohexylmethane are added. After the mixture has been heated at 200° C. for 2 hours, a vacuum is gradually established in the course of about 60 minutes down to 50 mm Hg. The reaction is continued in vacuo (50 mm Hg) for 30 minutes and then under normal pressure for 2 hours, and finally, a vacuum is again gradually established in the course of 60 minutes down to 50 nm Hg, and this pressure is maintained until the required acid number is reached (34 mg KOH/g). The coloration according to ASTM D2849 of the polyesteramides obtained is not more than 2 (Gardner).

Four carboxyl group-terminated polyesters, numbered C2 to C5, which are not according to the invention and are introduced by way of comparison were also prepared. A two-step process was carried out for their preparation. For the first step, the method is the same as for the first step of example 5. For the second step, for the preparation of polyester C2, 120 parts of trimellitic anhydride are introduced at 180° C. After esterification at this temperature under normal pressure and without removal of the water, a polyester having an acid number of 70 mg KOH/g is obtained. For the preparation of polyesters C3 to C5, the second step is carried out in the manner described above for the product of Example 13.

Table II shows the nature and amounts of the starting materials and the amounts of esterification catalyst (dibutyltin oxide) for each step of the synthesis of the polyesteramides and polyesters C2 to C5, and also the hydroxyl number (OHN) of the hydroxyl group-terminated polyester obtained in the first step, the acid number (AN) of the carboxyl group-terminated polyester obtained in the second step, and the acid number (AN), the ICI viscosity at 200° C., the average molecular weight $\overline{M}n$ and the glass transition temperature (Tg determined by DSC) of the final polyesteramide obtained in the third step. The coloration according to ASTM D2849 of the products obtained is not more than 2 (Gardner).

TABLE II

| Ex. | Step | Polyol(s) (parts) | Acid(s) (parts) | Catalyst (parts) | Diamine (parts) | Polyester OHN (mg KOH/g) | Polyester AN (mg KOH/g) | AN of the polyesteramide (mg KOH/g) | ICI viscosity at 200° C. (mPa · s) | $\overline{M}n$ | Tg (°C.) |
|---|---|---|---|---|---|---|---|---|---|---|---|
| 6 | 1 | NPG(346) PE(18) | TPA(476) | 2.1 | | 110 | | | | | |
| | 2 | | HHPAn(229) | | | | 90 | | | | |
| | 3 | | | | DADCHM(40) | | | 70 | 2,000 | 2,400 | 54 |
| 7 | 1 | NPG(376) | TPA(366) 1,2,4BTA(72) | 0.8 | | 140 | | | | | |
| | 2 | | AdA(127) HHPAn(134) | 0.8 | | | 100 | | | | |
| | 3 | | | | DADCHM(53) | | | 68 | 2,000 | 2,300 | 57 |
| 8 | 1 | NPG(327) dTMP(59) | TPA(473) | 0.9 | | 115 | | | | | |
| | 2 | | AdA(225) | 0.9 | | | 90 | | | | |
| | 3 | | | | DMDACHM (41) | | | 71 | 3,200 | 2,500 | 56 |
| 9 | 1 | NPG(306.5) TMP(60) | TPA(470) | 1.0 | | 120 | | | | | |
| | 2 | | CHDA(133.5) AdA(113) | 1.0 | | | 90 | | | | |
| | 3 | | | | DMDACHM (41) | | | 70 | 5,000 | 2,700 | 60 |
| 10 | 1 | NPG(376.5) | TPA(407.5) 1,3,5BTA(61) | 0.8 | | 110 | | | | | |
| | 2 | | AdA(215) | 0.8(1) | | | 90 | | | | |
| | 3 | | | 0.4(2) | DADCHM(70) | | | 53 | 4,800 | 3,300 | 59 |
| 11 | 1 | NPG(377.5) dTMP(26) | TPA(550) | 1.0 | | 70 | | | | | |
| | 2 | | AdA(138) | 1.0 | | | 50 | | | | |
| | 3 | | | | DMDACHM (41) | | | 30 | 7,000 | 5,500 | 62 |
| 12 | 1 | NPG(368) PE(17) | TPA(524) | 0.9 | | 90 | | | | | |
| | 2 | | AdA(46) | 0.9 | | | 70 | | | | |

TABLE II-continued

| Ex. | Step | Polyol(s) (parts) | Acid(s) (parts) | Catalyst (parts) | Diamine (parts) | Polyester OHN (mg KOH/g) | Polyester AN (mg KOH/g) | AN of the polyesteramide (mg KOH/g) | ICI viscosity at 200° C. (mPa·s) | $\overline{Mn}$ | Tg (°C.) |
|---|---|---|---|---|---|---|---|---|---|---|---|
|  | 3 |  | CHDA(161) |  | DACH(20) |  |  | 52 | 3,800 | 3,600 | 56 |
| 13 | 1 | NPG(395) | TPA(514.3) AdA(27) | 1.2 |  | 70 |  |  |  |  |  |
|  | 2 |  | IPA(155.5) | 1.2 |  |  | 50 |  |  |  |  |
|  | 3 |  |  |  | DADCHM (43) |  |  | 34 | 4,400 | 3,200 | 58 |
| 14 | 1 | NPG(411) TMP(14) | TPA(615) | 1.0 |  | 50 |  |  |  |  |  |
|  | 2 |  | AdA(98) | 1.0(1) |  |  | 30 |  |  |  |  |
|  | 3 |  |  | 0.45(2) | HMDA(10) |  |  | 22 | 5,800 | 7,600 | 63 |
| 15 | 1 | NPG(319.5) HPN(137) | TPA(497) 1,2,4BTA(39) | 1.0 |  | 60 |  |  |  |  |  |
|  | 2 |  | CHDA(107) AdA(23) | 1.0(3) |  |  | 35 |  |  |  |  |
|  | 3 |  |  | 1.0(2) | DMPDA (13.5) |  |  | 19 | 4,200 | 10,000 | 65 |
| 16 | 1 | NPG(359.3) TMP(24.4) | TPA(71.3) IPA(235.3) | 1.0 |  | 312 |  |  |  |  |  |
|  | 2 |  | CHDA(406.4) |  |  |  | 56 |  |  |  |  |
|  | 3 |  |  | 1.0 | DADCHM (39.9) |  |  | 33 | 7,200 | 4,900 | 60 |
| 17 | 1 | NPG(382.5) TMP(22.2) | TPA(71.7) IPA(501.5) | 1.0 |  | 62 |  |  |  |  |  |
|  | 2 |  | CHDA(143.3) |  |  |  | 48 |  |  |  |  |
|  | 3 |  |  | 1.0 | DADCHM (20.1) |  |  | 30 | 8,100 | 5,200 | 62 |
| 18 | 1 | NPG(340.8) TMP(37.0) | IPA(459.2) | 0.8 |  | 140 |  |  |  |  |  |
|  | 2 |  | IPA(152.6) CHDA(108.0) | 0.8 |  |  | 73 |  |  |  |  |
|  | 3 |  |  | 0.5 | DADCHM (37.9) |  |  | 50 | 6,300 | 3,300 | 56 |
| C2 | 1 | NPG(384) EG(20) | TPA(547) AdA(61) | 1.0 (3) |  | 40 |  |  |  |  |  |
|  | 2 |  | TMAn(120) |  |  |  | 70 |  | 8,500 | 3,200 | 60 |
| C3 | 1 | NPG(309) EG(54.5) TMP(33) | TPA(531) AdA(59) | 1.0 (3) |  | 80 |  |  |  |  |  |
|  | 2 |  | IPA(163) |  |  |  | 50 |  | 4,500 | 3,900 | 58 |
| C4 | 1 | NPG(388.5) EG(20.5) TMP(13) | TPA(584) AdA(65) | 1.0 (3) |  | 30 |  |  |  |  |  |
|  | 2 |  | IPA(78) |  |  |  | 30 |  | 6,000 | 5,500 | 57 |
| C5 | 1 | NPG(422) | TPA(573) AdA(30) | 2.6(3) |  | 50 |  |  |  |  |  |
|  | 2 |  | IPA(118) |  |  |  | 30 |  | 3,500 | 3,200 | 50 |

(1) plus 0.4 part of triphenyl phosphite (antioxidant).
(2) triphenyl phosphite.
(3) plus 1.0 part of triphenyl phosphite.

5 parts of triphenylphosphine, as the crosslinking catalyst, are generally added to the products obtained.

EXAMPLES 19 TO 25

Four-step Polyesteramide Synthesis (19)1st step.

293 parts of neopentylglycol and 73 parts of trimethylolpropane are introduced into a conventional reactor such as described above in Example 1. The mixture is heated at 130° C. until the products have melted, and 445 parts of terephthalic acid and 1.0 part of dibutyltin oxide, as the esterification catalyst, are then introduced. The temperature of the reaction mixture is then raised to 225° C. When 95% of the water of esterification has distilled off and the polyester is clear, a vacuum is gradually established in the course of one hour down to 50 mm Hg, and the reaction is continued in vacuo to give a hydroxyl group-terminated polyester having a hydroxyl number of 150 mg KOH/g.

2nd step.

The reaction mixture obtained in the first step is cooled to 200° C., and 159 parts of isophthalic acid and 1.0 part of dibutyltin oxide, as the esterification catalyst, are added thereto. The reaction mixture is then heated to 225° C. and this temperature is maintained until the polyester is completely clear. The polyester contains terminal hydroxyl and terminal carboxyl groups; the difference (ΔN) between the hydroxyl number and the acid number of this polyester is equal to −0.3 mg KOH/g.

3rd step.

The reaction mixture obtained in the second step is cooled to 200° C., and 1.0 part of dibutyltin oxide and 140 parts of adipic acid, that means an equimolar amount with respect to the amount of isophthalic acid used in the second step, are added. The temperature of the reaction mixture is then raised to 225° C. When the reaction mixture is completely clear, the pressure is reduced progressively in the course of one hour to 50 mm Hg. The operation is continued in vacuo to give a carboxyl group-terminated polyester having an acid number of 110 mg KOH/g.

4th step.

The reaction mixture is cooled to 200° C., and 36 parts of 4,4'-diaminodicyclohexylmethane and 20 parts of 1,6-hexanediamine are added thereto. The reaction mixture is heated to 225° C. After the mixture has been heated at 225° C. for one hour and when the polyesteramide is completely clear, a vacuum is gradually established in the course of one hour from normal pressure down to 50 mm Hg. The operation is continued in vacuo until an acid number of 72 mg KOH/g is reached. The viscosity, determined by the cone and plate viscometer (ICI viscosity) at 200° C., is 4,200 mpa.s, the average molecular weight $\overline{M}n$ is 2,600 and the glass transition temperature (Tg) is 57 (DSC). The coloration polyesteramides and polyester C6, and also the molar ratio between the aliphatic dicarboxylic acid used in the third step and isophthalic acid used in the second step, the hydroxyl number (OHN) of the hydroxyl group-terminated polyester obtained in the first step, the difference ($\Delta N$) between the hydroxyl number and the acid number of the polyester containing terminal hydroxyl and terminal carboxyl groups obtained in the second step, the acid number (AN) of the carboxyl group-terminated polyester obtained in the third step and the acid number (AN), the ICI viscosity at 200° C., the average molecular weight $\overline{M}n$ and the glass transition temperature (Tg, determined by DSC) of the final polyesteramide obtained in the fourth step. The coloration according to ASTM D2849 of the products obtained is not more than 2 (Gardner).

TABLE III

| Ex. | Step | Polyol(s) (parts) | Acid(s) (parts) | Catalyst (part) | Diamine (parts) | Molar ratio of AdA/ IPA or CHDA/ IPA (1) | OHN (2) | $\Delta N$ (3) | AN (4) | AN (5) | ICI viscosity (mPa·s) | $\overline{M}n$ | Tg (°C.) |
|---|---|---|---|---|---|---|---|---|---|---|---|---|---|
| 20 | 1 | NPG(360.5) TMP(35) | IPA(532) | 0.9 | | | 90 | | | | | | |
|  | 2 | | IPA(63) | 0.9 | | | | 36 | | | | | |
|  | 3 | | AdA(129) | | | 70/30 | | | 70 | | | | |
|  | 4 | | | | DADCHM(36) | | | | | 51 | 3,000 | 3,300 | 55 |
| 21 | 1 | NPG(379.5) TMP(23.5) | TPA(562) | 1.2 | | | 70 | | | | | | |
|  | 2 | | IPA(80) | | | | | 6 | | | | | |
|  | 3 | | AdA(70) | 1.2 | | 50/50 | | | 50 | | | | |
|  | 4 | | | | HMDA(20) | | | | | 29 | 6,300 | 5,600 | 60 |
| 22 | 1 | NPG(386) | TPA(433.5) 1,2,4BTA(58) | 0.9 | | | 100 | | | | | | |
|  | 2 | | IPA(138) | | | | | −18 | | | | | |
|  | 3 | | CHDA(95) | 0.9 | | 60/40 | | | 80 | | | | |
|  | 4 | | | | DMPDA(27) | | | | | 49 | 5,500 | 3,400 | 59 |
| 23 | 1 | NPG(406) | TPA(529) | 0.9 | | | 98 | | | | | | |
|  | 2 | | IPA(153) | | | | | −29 | | | | | |
|  | 3 | | AdA(34) | 0.9 | | 16.5/83.5 | | | 50 | | | | |
|  | 4 | | | | HMDA(20) | | | | | 33.5 | 5,900 | 3,700 | 65 |
| 24 | 1 | NPG(411) | TPA(545) | 1.0 | | | 90 | | | | | | |
|  | 2 | | IPA(136) | 1.0 | | | | −17 | | | | | |
|  | 3 | | AdA(30) | 0.5(6) | | 20/80 | | | 40 | | | | |
|  | 4 | | | | DADCHM(18) | | | | | 31 | 3,600 | 3,600 | 61 |
| 25 | 1 | NPG(408) TMP(5) | TPA(595.5) | 1.3 | | | 50 | | | | | | |
|  | 2 | | IPA(46) | 1.3 | | | | 14 | | | | | |
|  | 3 | | AdA(62) | 0.5(6) | | 60/40 | | | 35 | | | | |
|  | 4 | | | 0.5(6) | DADCHM (27.5) | | | | | 20 | 7,300 | 6,100 | 59 |
| C6 | 1 | NPG(340) TMP(58) | TPA(518) | 2.3 | | | 110 | | | | | | |
|  | 2 | | IPA(141) | | | | | −7 | | | | | | |
|  | 3 | | AdA(82.5) | | | | | | 70 | | 3,900 | 3,300 | 53 |

(1) Molar ratio between the (cyclo)aliphatic dicarboxylic acid used in the 3rd step and isophthalic acid used in the 2nd step.
(2) Hydroxyl number (in mg KOH/g) of the hydroxyl group-terminated polyester.
(3) Difference (in mg KOH/g) between the hydroxyl number and the acid number of the polyester containing terminal hydroxyl and terminal carboxyl groups.
(4) Acid number (in mg KOH/g) of the carboxyl group-terminated polyester.
(5) Acid number (in mg KOH/g) of the carboxyl group-terminated polyesteramide.
(6) Triphenyl phosphite (antioxidant).

of the product according to ASTM D2849 is not more than 2 (Gardner). 5 parts of triphenylphosphine, as cross-linking catalyst, are also added to the product.

(20 to 25)

Using the method described in Example 19, a series of polyesteramides according to the invention and also a carboxyl group-terminated polyester, numbered C6, which is introduced by way of comparison, were prepared. For the preparation of this last compound, the method followed is the same as for the first three steps of Example 19 (thus, without diamine).

Table III shows the nature and amounts of the starting materials and the amounts of esterification catalyst (dibutyltin oxide) for each step of the synthesis of the polyesteramides and polyester C6, and also the molar ratio between the aliphatic dicarboxylic acid used in 5 parts of triphenylphosphine, as crosslinking catalyst, are in general added to the products obtained.

EXAMPLE 26

Preparation of Powdered Thermosetting Compositions

The polyesteramides according to the invention obtained in Example 1 to 25 and the polyesters C1 to C6 which are not according to the invention are used to prepare a series of pigmented powders which can be used for the production of coatings by spraying by means of an electrostatic spray gun and which have the following formulation:

a)  50/50 formulations based on the polyesteramides of
    Examples 1, 5 to 9 and 19 and polyesters C2 and C6 (acid
    number = 70 mg KOH/g).
    | | |
    |---|---|
    | polyesteramide or polyester | 300 parts |
    | epoxy resin (1) | 300 parts |
    | titanium dioxide (2) | 400 parts |
    | flow regulator (3) | 10 parts |
    | benzoin | 3.5 parts | b)  60/40 formulations based on the polyesteramides of
    Examples 2, 10 and 20 (acid number = 50 mg KOH/g).
    | | |
    |---|---|
    | polyesteramide | 360 parts |
    | epoxy resin (1) | 240 parts |
    | titanium dioxide (2) | 400 parts |
    | flow regulator (3) | 10 parts |
    | benzoin | 3.5 parts | c)  70/30 formulations based on the polyesteramides of
    Examples 11 and 21 and polyester C4 (acid
    number = 30 mg KOH/g).
    | | |
    |---|---|
    | polyesteramide or polyester | 420 parts |
    | epoxy resin (1) | 180 parts |
    | titanium dioxide (2) | 400 parts |
    | flow regulator (3) | 10 parts |
    | benzoin | 3.5 parts | d)  90/10 formulations based on the polyesteramides of
    Examples 4, 12, 18 and 22 and polyesters C1 and C3 (acid
    number = 50 mg KOH/g).
    | | |
    |---|---|
    | polyesteramide or polyester | 540 parts |
    | glycidyl isocyanurate (4) | 60 parts |
    | titanium dioxide (2) | 400 parts |
    | flow regulator (3) | 10 parts |
    | benzoin | 3.5 parts | e)  93/7 formulations of the polyesteramides of
    Examples 3, 13, 16, 17, 23 and 24 and polyester C5 (acid
    number = 30 mg KOH/g).
    | | |
    |---|---|
    | polyesteramide or polyester | 558 parts |
    | glycidyl isocyanurate (4) | 42 parts |
    | titanium dioxide (2) | 400 parts |
    | flow regulator (3) | 10 parts |
    | benzoin | 3.5 parts | f)  96/4 formulations of the polyesteramides of
    Examples 14, 15 and 25 (acid number = 20 mg KOH/g).
    | | |
    |---|---|
    | polyesteramide | 576 parts |
    | glycidyl isocyanurate (4) | 24 parts |
    | titanium dioxide (2) | 400 parts |
    | flow regulator (3) | 10 parts |
    | benzoin | 3.5 parts |

(1) Araldite GT7004 (Ciba Geigy)
(2) Kronos CL310 (Ciba Geigy)
(3) Resiflow PV5 (Worlee Chemie)
(4) Araldite PT810 (Ciba Geigy)

These powders are prepared by mixing and homogenizing the various ingredients at a temperature of about 100° C. in a Buss-Ko-Kneter PR 46 or Baker Perkins MP 2030 extruder and then cooling, grinding and sieving the extrudate. The powders thus obtained have a particle size of between 25 and 100 micrometers.

EXAMPLE 27

Triboelectric Charging Characteristics of the Compositions

A) In a first experiment, the value of the electric charge acquired by the powder during its passage through a triboelectric spray gun, the charging tubes of which are made of a material based on polytetrafluoroethylene, is determined by measuring the intensity of the electric current produced between the gun and the earth at increasing air pressures exerted on the gun (0.5 to 3.5 kg/cm$^2$) and at various air pressures on the venturi pump of the fluidized bed (1 kg/cm$^2$ and 3 kg/cm$^2$). In this test, the value of the electric charge obtained with the powder formulated with the polyesteramide prepared in Example 9 (according to the invention) was compared with that obtained with the powder formulated with polyester C6 (comparative); these two pigmented powders are prepared as described in Example 26 using the 50/50 formulation shown in paragraph a).

The results obtained are shown in Tables IVa and IVb, in which the values reported represent the current intensities, expressed in microamperes ($\mu$A), as a function of the air pressure exerted on the gun. Table IVa gives the results for an air pressure of 1 kg/cm$^2$ on the venturi pump of the fluidized bed, and Table IVb gives the results for an air pressure of 3 kg/cm$^2$.

TABLE IV

| Pressure on the gun (in kg/cm$^2$) | Current intensity (in $\mu$A) | |
|---|---|---|
| | Formulation based on the polyesteramide of Example 9 | Polyester C6 |
| (pressure on the venturi of 1 kg/cm$^2$). | | |
| 0.5 | 0.8 | 0 |
| 1.0 | 1.0 | 0 |
| 1.5 | 1.4 | 0 |
| 2.0 | 1.9 | 0 |
| 2.5 | 2.4 | 0 |
| 3.0 | 2.8 | 0 |
| 3.5 | 3.1 | 0 |
| (pressure on the venturi of 3 kg/cm$^2$). | | |
| 0.5 | 1.3 | 0.0 |
| 1.0 | 2.7 | 0.8 |
| 1.5 | 4.2 | 1.5 |
| 2.0 | 5.5 | 1.4 |
| 2.5 | 6.5 | 1.6 |
| 3.0 | 7.3 | 1.5 |
| 3.5 | 8.0 | 1.3 |

It can be seen that the incorporation of amide functions into the polymer chain enables the electrostatic charge of the powder to be increased considerably. In fact, the current intensity reaches and substantially exceeds 2 microamperes in the case of the powder based on the polyesteramide of Example 9 according to the invention, whereas the powder based on polyester C6, which is not according to the invention, does not acquire a charge at all or acquires only an insufficient charge, the current intensity reaching only 1.6 microamperes in the most favorable case.

In conclusion, only the powder compositions prepared from the polyesteramides according to the invention are suitable for obtaining coatings by spraying with a triboelectric spray gun.

B) In another experiment, the quantitative value of the electric charge acquired by the powder during its passage through a triboelectric gun of similar construction to that used for the first experiment is determined by measuring the intensity of the electric current produced between the gun and the earth ($I_{TA}$) on the one hand and the intensity of the current produced between a 0.625 mm thick aluminium (3003 H14) article and the earth ($I_{VA}$) on the other hand, for a constant air pressure of 3 kg/cm$^2$ on the gun and of 2 kg/cm$^2$ on the venturi. The results obtained with the powders formulated with the polyesteramides prepared in Examples 1 to 25 are reported in Table V, which also includes, by way of comparative examples, powders formulated with polyesters C1 to C5 which are not according to the invention. These latter products have been included by way of reference for better illustrating the specific advantages of the present invention. The powders were formulated as described in Example 26. The values shown in Table V represent the current intensity, expressed in microamperes ($\mu$A).

TABLE V

| Formulation based on the polyesteramide of Example | Current intensity in (μA) | |
|---|---|---|
| | $I_{TA}$ | $I_{VA}$ |
| 1 | 4.0 | −2.5 |
| 2 | 3.7 | −2.5 |
| 3 | 3.8 | −2.6 |
| 4 | 4.0 | −3.4 |
| 5 | 3.5 | −2.2 |
| 6 | 4.2 | −2.4 |
| 7 | 3.4 | −2.5 |
| 8 | 3.5 | −2.6 |
| 9 | 3.8 | −2.9 |
| 10 | 3.5 | −2.5 |
| 11 | 3.8 | −3.5 |
| 12 | 3.8 | −2.7 |
| 13 | 3.5 | −2.9 |
| 14 | 3.7 | −2.7 |
| 15 | 3.6 | −2.5 |
| 16 | 4.1 | −2.8 |
| 17 | 3.8 | −2.9 |
| 18 | 4.0 | −3.2 |
| 19 | 4.0 | −2.6 |
| 20 | 4.3 | −2.2 |
| 21 | 3.8 | −3.5 |
| 22 | 4.0 | −2.5 |
| 23 | 3.7 | −2.8 |
| 24 | 3.5 | −2.7 |
| 25 | 3.2 | −2.7 |
| Polyester (1) | | |
| C1 | 1.0 | −0.6 |
| C2 | 0.7 | −0.4 |
| C3 | 1.2 | −0.5 |
| C4 | 1.8 | −1.4 |
| C5 | 1.7 | −1.0 |

(1) by way of comparison.

The results obtained show that the powders according to the invention acquire a good charge in a triboelectric spray gun; the current intensity substantially exceeds 2 microamperes. On the other hand, powders containing polyesters having carboxyl groups which are not according to the invention acquire an insufficient charge to enable application by the triboelectric process.

(C) Recycling test.

In this test, the value of the electric charge acquired by the powder is determined in the same way and under the same pressure conditions as in experiment B) above, but measurements are also taken on the powder recovered after a first application to the article to be coated. The results obtained with the powder formulated with the polyesteramide prepared in Example 9 are reproduced in Table VI, in which the average diameter of the powder particles during the first application and after each recovery is also shown.

TABLE VI

| | Mean diameter of the particles (in μm) | Current intensity (in μA) | |
|---|---|---|---|
| | | $I_{TA}$ | $I_{VA}$ |
| 1st application | 52.20 | 5.1 | −4.3 |
| 1st recovery | 49.05 | 5.0 | −4.4 |
| 2nd recovery | 34.81 | 5.2 | −4.3 |
| 3rd recovery | 33.68 | 4.9 | −4.3 |

It can be seen that in spite of the reduction in the diameter of the particles, the triboelectric charging properties remain excellent after several recoveries.

EXAMPLE 28

Characteristics of the Paint Coatings

The pigmented powders formulated as described in Example 26 with the polyesteramides according to the invention prepared in examples 1 to 25 are applied to a degreased steel plate having a thickness of 0.5 mm by means of a triboelectric gun.

In parallel, by way of comparison, the powders formulated as described in Example 26 with polyesters C1 to C5 which are not according to the invention are applied to the same substrate by means of a conventional spray gun in an electrostatic field under a voltage of 40 kV. The thickness of the coatings thus obtained is 65 micrometers. The minimum temperature which allows curing of the coating within 10 minutes is then determined for each powder, and the coatings obtained after curing are subjected to the conventional tests. The results obtained are reproduced in Table VII, in which the 1st column gives the tested formulation, the 2nd column gives the minimum curing temperature (in °C.), the 3rd column gives the gloss value at an angle of 60° (in %) according to ASTM D523, the 4th column gives the behavior of the coating when bent on a conical mandrel of 3 mm diameter (ASTM D522), the 5th column gives the value obtained in the Erichsen embossing test (in mm) according to ISO 1520, the 6th column gives the value of the resistance to reverse impact (in kg.cm) according to ASTM D2794, the 7th column gives the value of the resistance to direct impact (in kg.cm) according to ASTM D2794.

The coatings were also subjected to an accelerated ageing test in order to estimate the resistance to ultraviolet radiation (Q-UV test). To this effect, the coatings are placed in a Q-UV chamber (from the Q-Panel Company), where they are subjected to two ageing cycles per day. Each cycle comprises a period of 8 hours of irradiation under four UV Lamps (FS40) at 60° C. (black panel temperature) in a dry atmosphere, followed by a period of 4 hours in darkness at 40° C. under 100% relative humidity. The gloss of the films is measured each day at an angle of 60° in accordance with ASTM D523.

In this test, the coatings obtained with the powders formulated with the polyesteramides (according to the invention) prepared in Example 4, 22 and 24 are compared respectively with those obtained with the powders formulated with polyesters C1, C3 and C5 (not according to the invention).

The polyesteramide of Example 4 and polyester C1 are formulated into a powdered varnish having the following composition (90/10 formulation)

| | |
|---|---|
| polyesteramide or polyester | 855 parts |
| triglycidyl isocyanurate | 95 parts |
| flow regulator | 48 parts |
| benzoin | 2 parts |

The polyesteramide of Example 22 and polyester C3 are formulated into a deep gray colored powdered paint having the composition given below (90/10 formulation), whereas the polyesteramide of Example 24 and polyester C5 are formulated into a similar powdered paint in a 93/7 formulation:

|                              | Formulation |           |
|------------------------------|-------------|-----------|
|                              | 90/10       | 93/7      |
| polyesteramide or polyester  | 597         | 616 parts |
| triglycidyl isocyanurate     | 66          | 47 parts  |
| barium sulfate (1)           | 165         | 165 parts |
| iron oxide (2)               | 132         | 132 parts |
| titanium dioxide (3)         | 33          | 33 parts  |
| flow regulator               | 4           | 4 parts   |
| benzoin                      | 3           | 3 parts   |

(1) Blanc Fixe N (Sachtleben)
(2) Bayferrox 318 (Bayer)
(3) Kronos 2160 (Kronos Titan)

The coatings applied using the powders based on the polyesteramides of Examples 4 and 22 and on polyesters C1 and C3 are cured at 200° C. for 10 minutes and the coatings applied using the powders based on the polyesteramide of Example 24 and on polyester C5 are cured at 160° C. for 10 minutes.

The value of the relative gloss (expressed in %) as a function of time is given for the six powders in Table VIII

TABLE VII

| Formulation based on the polyesteramide of example | Minimum curing temperature (°C.) | Gloss at 60° (%) | Conical mandrel | Erichsen embossing (mm) | Reverse impact 10 minutes (kg · cm) | Direct impact 10 minutes (kg · cm) |
|---|---|---|---|---|---|---|
| 1  | 180 | 90 | Pass | 9.3  | 160 | 160 |
| 2  | 180 | 90 | Pass | 9.8  | 160 | 160 |
| 3  | 200 | 86 | Pass | 9.8  | 160 | 160 |
| 4  | 200 | 90 | Pass | 10.0 | 160 | 160 |
| 5  | 180 | 85 | Pass | 10.3 | 160 | 160 |
| 6  | 180 | 87 | Pass | 9.8  | 160 | 160 |
| 7  | 180 | 92 | Pass | 9.6  | 160 | 160 |
| 8  | 180 | 88 | Pass | 10.1 | 160 | 160 |
| 9  | 180 | 93 | Pass | 9.0  | 160 | 160 |
| 10 | 180 | 87 | Pass | 10.2 | 160 | 160 |
| 11 | 180 | 91 | Pass | 9.7  | 160 | 160 |
| 12 | 200 | 88 | Pass | 9.9  | 160 | 160 |
| 13 | 160 | 93 | Pass | 10.0 | 160 | 160 |
| 14 | 200 | 88 | Pass | 9.5  | 160 | 140 |
| 15 | 200 | 93 | Pass | 9.8  | 160 | 160 |
| 16 | 200 | 91 | Pass | 9.3  | 160 | 160 |
| 17 | 200 | 93 | Pass | 9.0  | 160 | 160 |
| 18 | 200 | 89 | Pass | 9.0  | 160 | 160 |
| 19 | 180 | 95 | Pass | 9.4  | 160 | 160 |
| 20 | 180 | 90 | Pass | 9.0  | 160 | 160 |
| 21 | 180 | 85 | Pass | 9.5  | 160 | 160 |
| 22 | 200 | 92 | Pass | 9.8  | 160 | 160 |
| 23 | 180 | 90 | Pass | 9.6  | 160 | 160 |
| 24 | 160 | 94 | Pass | 10.5 | 160 | 160 |
| 25 | 200 | 90 | Pass | 9.3  | 140 | 140 |
| Polyester (1) | | | | | | |
| C1 | 200 | 92 | Pass | 9.5 | 160 | 160 |
| C2 | 180 | 94 | Pass | 9.7 | 160 | 160 |
| C3 | 200 | 91 | Pass | 9.7 | 160 | 160 |
| C4 | 180 | 90 | Pass | 9.3 | 160 | 160 |
| C5 | 200 | 98 | Pass | 9.9 | 160 | 160 |

(1) by way of comparison

TABLE VIII

| | Relative gloss at 60° (%) | | | | | |
|---|---|---|---|---|---|---|
| | Formulation based on | | | | | |
| Time (days) | polyesteramide of ex. 4 | polyester C1 | polyesteramide of ex. 22 | polyester C3 | polyesteramide of ex. 24 | polyester C5 |
| 0  | 100 | 100 | 100 | 100 | 100 | 100 |
| 2  |     |     | 98  | 98  | 98  | 98  |
| 4  |     |     | 96  | 96  | 96  | 96  |
| 6  |     |     | 96  | 96  | 96  | 96  |
| 8  | 93  | 95  | 96  | 97  | 96  | 98  |
| 10 |     |     | 95  | 98  | 96  | 100 |
| 12 |     |     | 90  | 92  | 90  | 92  |
| 14 | 94  | 95  | 77  | 80  | 78  | 81  |
| 16 |     |     | 58  | 58  | 54  | 54  |
| 18 |     |     | 30  | 30  | 30  | 30  |
| 20 | 92  | 91  | 24  | 24  | 24  | 24  |
| 22 |     |     | 18  | 18  | 18  | 18  |
| 24 |     |     | 10  | 10  | 10  | 10  |
| 26 |     |     | 6   | 10  | 7   | 7   |
| 28 | 84  | 85  | 0   | 0   | 5   | 5   |
| 32 | 73  | 72  |     |     |     |     |
| 42 | 50  | 49  |     |     |     |     |
| 63 | 28  | 25  |     |     |     |     |

These results clearly demonstrate that the powdered compositions based on the polyesteramides according to the invention give paint and varnish coatings which have similar properties to those of corresponding coatings obtained from the compositions of the prior art which are based on polyesters.

What is claimed is:

1. A carboxyl group-terminated polyesteramide which comprises the reaction product of at least one diamine and a carboxyl group-terminated polyester, said carboxyl group-terminated polyester being selected from the group consisting of
   (a) a polyester prepared from at least one aliphatic and/or cycloaliphatic dicarboxylic acid and at least one polyol;
   (b) a polyester which is the reaction product of
      (i) at least one dicarboxylic acid selected from aliphatic dicarboxylic acids, cycloaliphatic dicarboxylic acids and isophthalic acid, with
      (ii) a hydroxyl group-terminated polyester prepared from at least one aromatic and/or aliphatic and/or cycloaliphatic polycarboxylic acid and at least one polyol; and
   (c) a polyester which is the reaction product of
      (i) at least one aliphatic and/or cycloaliphatic dicarboxylic acid with
      (ii) a polyester containing both terminal hydroxyl and terminal carboxyl groups, prepared by esterification of
      (iv) a hydroxyl group-terminated polyester prepared from at least one aromatic and/or aliphatic and/or cycloaliphatic polycarboxylic acid and at least one polyol,
the said carboxyl group-terminated polyesteramide having a glass transition temperature of between 50° and 70° C.

2. A polyesteramide according to claim 1, which has an acid number of from 10 to 100 mg KOH/g and a number-average molecular weight of between 1,000 and 16,000.

3. A polyesteramide according to claim 1, which has an acid number of from 20 to 70 mg KOH/g and a number-average molecular weight between 1,500 and 8,500.

4. A polyesteramide according to claim 1, wherein the diamine is a diprimary diamine, a disecondary diamine or a diamine which is both primary and secondary.

5. A polyesteramide according to claim 1, wherein the diamines is a diprimary diamine.

6. A polyesteramide according to claim 1, wherein the diamine is an aliphatic, a cycloaliphatic or an aromatic diamine.

7. A polyesteramide according to claim 1, wherein the diamine is an aliphatic or a cycloaliphatic diamine.

8. A polyesteramide according to claim 1, wherein the diamine is selected from the group consisting of ethylenediamine, 1,3-propanediamine, 1,5-pentanediamine, 1,6-hexanediamine, 1,2-cyclohexanediamine, 1,3-cyclohexanediamine, 1,4-cyclohexanediamine, 2,2-dimethyl-1,3-propanediamine, N-(2-aminoethyl)-1,2-ethanediamine, 3,3'-dimethyl-4,4'-diaminodicyclohexylmethane, 4,4'-diaminodicyclohexylmethane, 3,3'-dimethyl-4,4'-diaminodiphenylmethane, 4,4'-diaminodiphenylmethane and mixtures thereof.

9. A polyesteramide according to claim 1, wherein the polyol is a dihydric to tetrahydric aliphatic, cycloaliphatic or aromatic polyol.

10. A polyesteramide according to claim 9, wherein the polyol is selected from the group consisting of neopentylglycol, ethylene glycol, diethylene glycol, 1,2-propanediol, 1,3-propanediol, 1,4-butanediol, 1,5-pentanediol, 1,6-hexanediol, neopentylglycol hydroxypivalate, bisphenol A, 1,4-cyclohexanedimethanol, 2,2-bis(4-hydroxycyclohexyl)-propane, trimethylolpropane, di-trimethylolpropane, pentaerythritol and mixtures thereof.

11. A polyesteramide according to claim 1, wherein the aliphatic or cycloaliphatic di- or polycarboxylic acid is selected from the group consisting of adipic acid, succinic acid, glutaric acid, sebacic acid, azelaic acid, 1,2-cyclohexanedicarboxylic acid, 1,3-cyclohexanedicarboxylic acid, 1,4-cyclohexanedicarboxylic acid, tetrahydrophthalic acid, hexahydrophthalic acid, an anhydride of the aforesaid acids and mixtures thereof.

12. A polyesteramide according to claim 1, wherein the aromatic polycarboxylic acid is selected from the group consisting of o-phthalic acid, isophthalic acid, terephthalic acid, 1,2,4-benzenetricarboxylic acid, 1,3,5-benzenetricarboxylic acid, an anhydride of the aforesaid acids and mixtures thereof.

13. A polyesteramide according to claim 1, wherein the carboxyl group-terminated polyester has an acid number of from 20 to 200 mg KOH/g.

14. A polyesteramide according to claim 13, wherein the carboxyl group-terminated polyester has an acid number of from 30 to 110 mg KOH/g.

15. A polyesteramide according to claim 1, wherein the hydroxyl group-terminated polyester has a hydroxyl number of from 30 to 400 mg KOH/g.

16. A polyesteramide according to claim 15, wherein the hydroxyl group-terminated polyester has a hydroxyl number of from 50 to 150 mg KOH/g.

17. A polyesteramide according to claim 1, wherein the difference between the hydroxyl number and the acid number of the polyester containing both terminal hydroxyl and terminal carboxyl groups is between $-100$ and $+100$ mg KOH/g.

18. A polyesteramide according to claim 17, wherein the difference between the hydroxyl number and the acid number of the polyester containing both terminal hydroxyl and terminal carboxyl groups is between $-50$ and $+50$ mg KOH/g.

19. A polyesteramide according to claim 1, wherein the molar ratio between the aliphatic and/or cycloaliphatic dicarboxylic acid and the isophthalic acid in the carboxyl group-terminated polyester (c) is in the range of from 1:99 to 99:1.

20. A polyesteramide according to claim 1, wherein the amount of diamine is between 1 and 20 parts by weight per 100 parts by weight of carboxyl group-terminated polyesteramide.

21. A process for the preparation of a polyesteramide according to claim 1, which comprises
   (1) preparing first a straight- or branched-chain carboxyl group-terminated polyester from at least one aliphatic and/or cycloaliphatic dicarboxylic acid and at least one polyol in the molar proportions required to obtain terminal carboxyl groups and
   (2) then reacting the carboxyl group-terminated polyester prepared in (1) with at least one diamine.

22. A process for the preparation of a polyesteramide according to claim 1, which comprises
   (1) preparing first a straight- or branched-chain hydroxyl group-terminated polyester from at least one aromatic and/or aliphatic and/or cycloaliphatic polycarboxylic acid and at least one polyol in the proportions required to obtain terminal hydroxyl groups;

(2) esterifying in a further step the hydroxyl group-terminated polyester prepared in (1) with at least one dicarboxylic acid selected from aliphatic dicarboxylic acids, cycloaliphatic dicarboxylic acids and isophthalic acid to obtain a carboxyl group-terminated polyester, and (3) finally, reacting the carboxyl group-terminated polyester prepared in (2) with at least one diamine.

23. A process for the preparation of a polyesteramide according to claim 1, which comprises (1) preparing first a straight- or branched-chain hydroxyl group-terminated polyester from at least one aromatic and/or aliphatic and/or cycloaliphatic polycarboxylic acid and at least one polyol in the proportions required to obtain terminal hydroxyl groups;

(2) esterifying the hydroxyl group-terminated polyester prepared in (1) with isophthalic acid in the proportions required to obtain a polyester containing both terminal hydroxyl and terminal carboxyl groups;

(3) esterifying in a further step the polyester containing both terminal hydroxyl and terminal carboxyl groups prepared in (2) with at least one aliphatic and/or cycloaliphatic dicarboxylic acid to obtain a carboxyl group-terminated polyester, and (4) finally, reacting the carboxyl group-terminated polyester prepared in (3) with at least one diamine.

* * * * *